March 23, 1954  P. BLUM  2,672,638
WINDOW WASHER AND WIPER
Filed Nov. 30, 1950  2 Sheets-Sheet 2
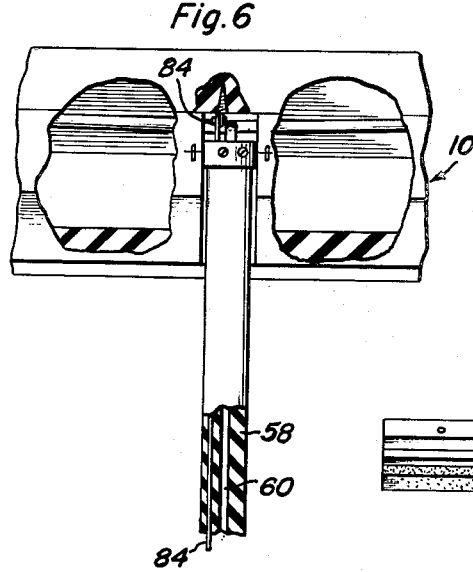
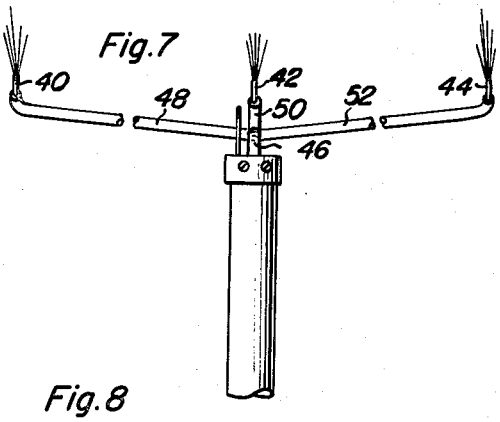
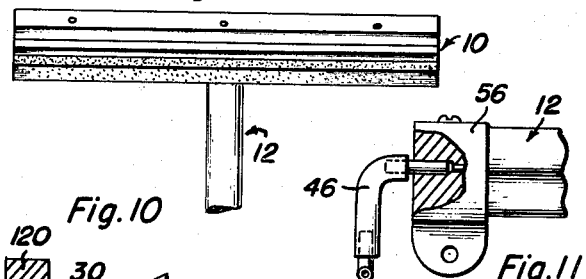
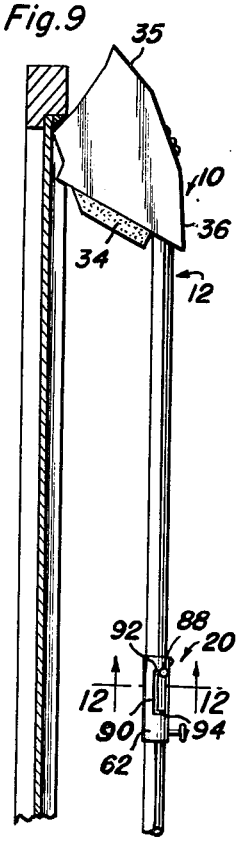
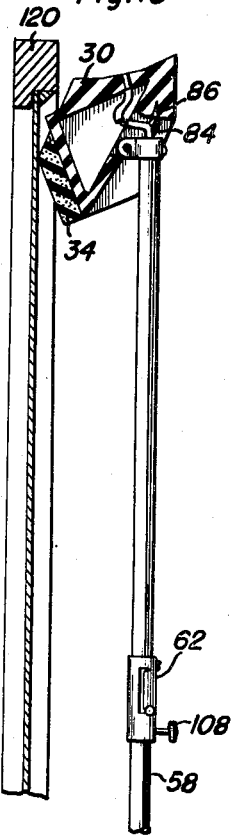
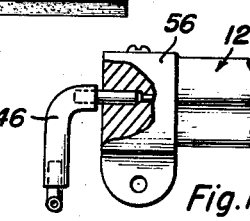
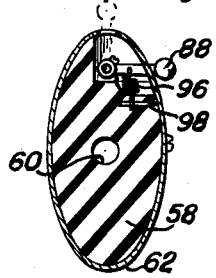
Paul Blum
INVENTOR.
BY *Clarence A. O'Brien and Harvey B. Jackson*
Attorneys Patented Mar. 23, 1954

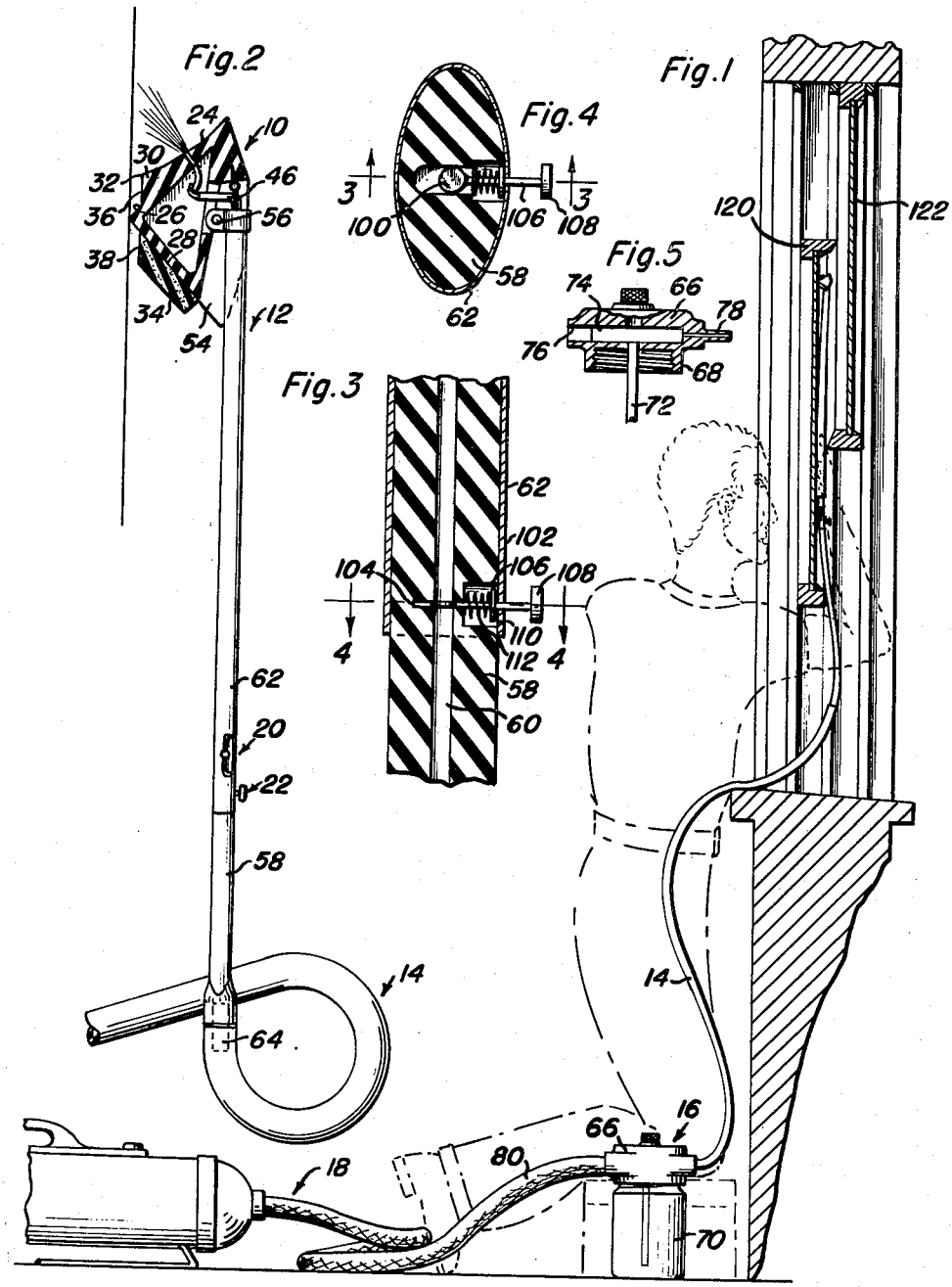

2,672,638

UNITED STATES PATENT OFFICE 2,672,638

WINDOW WASHER AND WIPER

Paul Blum, New York, N. Y.

Application November 30, 1950, Serial No. 198,307

3 Claims. (Cl. 15—118)

The present invention relates to improvements in window washers and wipers and more particularly to a device which is adapted to be inserted between inner and outer windows for washing the outer surface of the inner window when in a position intermediate the upper and lower ends of the frame.

An object of the present invention is to provide an improved window washer and wiper wherein the head of the device is pivotally mounted with respect to the handle and has first and second faces, the first face providing a washing surface formed of sponge rubber and the second face providing a wiping edge integrally formed with the head and of the same material.

A further object of the present invention is to provide a means for positively pivoting the window washer and wiper head with respect to the handle whereby the desired face may be engaged with the window performing the desired function.

Another object of the present invention is to provide a latch means for the means for pivoting the window washer and wiper head, whereby the head may be maintained in either of its pivoted positions.

A still further object of the present invention is to provide a window wiper and washer formed with a plurality of nozzles in the head thereof in combination with a liquid supply and a vacuum pressure hose for forcing the liquid through the nozzles.

Another object of the present invention is to provide a valve intermediate the ends of the handle for controlling the flow of fluid therethrough whereby the flow of fluid may be stopped when it is desired to wash or wipe the windows after spraying.

Various other objects and advantages will become apparent from the detailed description to follow. The best form in which I have contemplated applying my invention is clearly illustrated in the accompanying drawings, wherein:

Figure 1 is an elevational view showing the entire combination of the present invention as inserted between inner and outer windows for washing the outer surface of the inner window and with parts in section;

Figure 2 is an elevational view of the handle and window washer and wiper head with the head in section and in spraying position;

Figure 3 is a detailed sectional view through a portion of the handle and showing the details of the valve for controlling the flow through the handle;

Figure 4 is a horizontal transverse sectional view taken substantially along the plane of line 4—4 of Figure 3;

Figure 5 is a detailed sectional view of the cap which is employed for securing to the bottle providing a reservoir for the liquid and showing the inlet connection for the vacuum pressure hose and the outlet connection for the handle hose;

Figure 6 is a detailed partial elevational view looking from the right in Figure 2 with parts broken away;

Figure 7 shows details of construction of the handle end conduit means connected with the nozzles of the head;

Figure 8 is a side elevational view of the window washer and wiper head attached to a portion of the handle;

Figure 9 is a view of the device of the present invention when in wiping position;

Figure 10 is a detail view similar to Figure 9 but showing the head in section and in washing position;

Figure 11 is a detail view showing the connection between the conduits and the upper end of the handle; and Figure 12 is a detail horizontal sectional view taken substantially along the plane of line 12—12 of Figure 9.

Referring more particularly to the drawings, wherein like numerals designate like parts throughout, the numeral 10 designates generally a window washer and wiper head which is pivotally secured to the handle 12, the numeral 14 designates generally the hose connecting the handle 12 with the liquid supply means 16 which is connected to a conventional vacuum cleaner and vacuum pressure hose 18. The numeral 20 designates generally the means for effecting pivoting movement of the head 10, while the numeral 22 designates generally the valve means employed in conjunction with the handle 12 for controlling the flow of fluid therethrough.

The head 10 is comprised of a substantially triangularly shaped elongated and hollow member 24 formed of hard rubber or the like. Member 24 is provided with a pair of faces 26 and 28, the face 26 being formed with a longitudinally extending projection 30 providing a wiper edge 32, while the face 28 has secured thereto a sponge rubber elongated wiping element 34 which provides a washing element. The wiper projection 30 and the washer member 34 each have their outer faces 36 and 38 beveled to prevent undesirable engagement with the window during reciprocatory movement of the window washer while spraying as in Figure 2. The head 10 is provided with a plurality of nozzles 40, 42 and 44 which extend through the face 26 and are connected to a common conduit 46 by means of the conduits 48, 50 and 52. The head 10 is also provided with a recessed portion 54 in which is received the upper end of the handle 12. The upper end of the handle 12 has the head 10 pivotally secured thereto at 56.

The handle 12 is comprised of a tubular rubber-like element 58 having a passage 60 therethrough and a metallic casing 62 disposed over a major portion of the handle. The handle is preferably of flattened form, as shown in Figure 4 in elliptical cross section. However, the handle may be of rectangular cross section or of circular cross section if desired.

The handle 12 has a hose 14 secured thereto by means of the coupling conduit 64 which is engaged in the rear end of the handle 12 and the upper end of the conduit 14.

The opposite end of the conduit 14 is secured within the cap 66 which is shown in detail in Figure 5. The cap 66 has a downwardly extending annular portion 68 which is suitably engaged on the open end of a bottle 70 containing water or the like. A tube 72 concentrically formed with the cap 66 and extends downwardly into the bottle 70. The upper end of the tube 72 is in communication with the bore 74. The bore 74 is in open communication with the inlet end 76 and outlet end and passage 78. The conduit 14 is secured to the outlet end and passage 78, while the vacuum cleaner hose 80 is secured to the inlet end 76. It will readily be seen that pressure from the hose of the vacuum cleaner will work as in a conventional injector and will force fluid through the conduit 14 and out the plurality of nozzles in the head 10.

Looking now at Figures 9, 10 and 12, it will be seen that the means 20 for effecting pivoting movement of the head 10 is comprised of a rigid cable or rod 84 secured to the head by means of a screw 86 at its uper end and secured to the pin 88 at its lower end. The sleeve 62 is formed with a slot 90 which is longitudinally disposed and has a pair of angularly related slots 92 and 94 connected therewith. The pin 88 is adapted to ride within the slots 90, 92, 94 for vertically reciprocating the cable 84, the pin when engaged in either of the slots 92 and 94 being adapted to retain the head pin from further pivoting movement from the selected position. A coil tension spring 96 is secured to the pin 88 of the detent 90 to maintain the pin 88 normally engaged within either of the slots 92 or 94 when the pin is moved to either of the ends of the slot 90.

The passage 60 through the handle 12 is controlled by means of the reciprocating valve 100. The tubular handle 58 is formed with a first recess 102 and a second reduced cross section recess 104 in open communication with the first recess 102. The valve member 100 is reciprocably disposed within the recess 104 and has the stem 106 extending therefrom into the recess 102. The outer end of the stem 106 extends through the sleeve 62 and has a handle button 108 integrally formed therewith at its outer end. The stem 106 is also formed with a spring retaining disk 110, against which the compression spring 112 abuts when normally urging the valve outwardly. The valve 100 is of circular form and is adapted to completely close out the passage 60 when in the position shown in Figure 3. When it is desired to open the passage, the button 108 is depressed and the valve 100 becomes disposed within the end portion of the recess 104.

In view of the foregoing description, taken in conjunction with the drawings, it is believed that a device has been provided which will accomplish all of the objects herein above set forth. It is also believed that one skilled in the art will readily understand the operation of the window washer and wiper of the present invention from a consideration of the foregoing.

As seen best in Figure 1, the inner window 120 is in raised position, while the outer window 122 is in its normally upper position. The window washer is inserted between the inner and outer windows with the wiper head 10 facing the outer surface of the inner window 120. The vacuum cleaner 18 is actuated and the pressure hose 80 is connected to the bottle 70 thereby providing a pressure within the hose 14. Upon depression of the valve button 108, the passage 60 is opened and liquid will pass from the bottle 70 through the conduit 14 into the handle 12 due to the pressure of the vacuum pressure hose. Water or other cleaning fluid will dispense through the plurality of nozzles in the head 10. Next, the head 10 is pivoted to the washing position as shown in Figure 10 by means of the actuating pin 88 which is moved downwardly and engaged in the slot 94. The washer is then reciprocated so that the sponge rubber member 34 engages the surface of the window pane.

Next, the window is wiped by pivoting the head 10 with respect to the handle, the pivoting being effected by upward movement of the pin 88 in the slot and then into the slot 92. The projecting wiping edge 30 will then be in the position shown in Figure 9 for engagement with the window pane. Reciprocation will effect wiping of the window.

1. A window washer comprising a tubular handle, a head pivotally secured to one end of said handle, outlet nozzles in said head and connected to said tubular handle, said head being pivotally mounted on said handle, and means on said handle for pivoting said head, said handle having a separate longitudinal bore therethrough, said means including a rod secured at one end to said head and extending slidably through said bore, the other end of said rod terminating adjacent the base of the handle, said handle having a longitudinal slot therein opening into said bore adjacent said other end of said rod, a transverse pin extending from said rod through said slot for vertically reciprocating said rod and pivoting said head, said handle having longitudinally spaced transverse slots therein communicating with said longitudinal slot, means biasing said pin into engagement with one of said transverse slots to selectively lock said rod against vertical reciprocation and thus prevent pivoting movement of said head, said head having angularly related surfaces thereon, said nozzles opening into one of said surfaces and a washing member on the other of said surfaces.

2. A window washing device comprising an elongated handle having a pair of longitudinal bores therethrough, a head pivotally secured to one end of said handle, said bores opening into said head, said head having a pair of angularly related surfaces, one of said surfaces having discharge orifices opening thereinto and the other of said surfaces having wiping means thereon, a rod extending slidably through one of said bores and having one end thereof connected to said head, said head being swingable about its pivot upon movement of said rod, said handle having a longitudinally extending slot therein opening into said one bore, a transverse pin secured to said rod and projecting through said slot for sliding said rod, means communicating said nozzles with said other bore.

3. A window washing device comprising an elongated handle having a pair of longitudinal bores therethrough, a head pivotally secured to one end of said handle, said bores opening into said head, said head having a pair of angularly related surfaces, one of said surfaces having discharge orifices opening thereinto and the other of said surfaces having wiping means thereon, a rod extending slidably through one of said bores and having one end thereof connected to said head, said head being swingable about its pivot upon movement of said rod, said handle having a longitudinally extending slot therein opening into said one bore, a transverse pin secured to said rod and projecting through said slot for sliding said rod, means communicating said nozzles with said other bore, said handle having longitudinally spaced, transversely extending slots opening into said one bore and communicating with said longitudinal slot, said pin seating in one of said transversely extending slots to lock the head in a selected pivoted position.

PAUL BLUM.

References Cited in the file of this patent

UNITED STATES PATENTS

| Number | Name | Date |
|---|---|---|
| 556,722 | Ford | Mar. 17, 1896 |
| 1,358,597 | Tobias | Nov. 9, 1920 |
| 1,498,246 | Spencer | June 17, 1924 |
| 1,632,515 | Smith | June 14, 1927 |
| 1,668,931 | Zimmer | May 8, 1928 |
| 1,766,529 | Peirson | June 24, 1930 |
| 1,818,917 | Wolf | Aug. 11, 1931 |
| 2,006,289 | Andvig | June 25, 1935 |
| 2,104,161 | Koukal | Jan. 4, 1938 |
| 2,188,114 | Hubbard | Jan. 23, 1940 |
| 2,509,568 | Lachapelle | May 30, 1950 |
| 2,534,086 | Vosbikian | Dec. 12, 1950 |

FOREIGN PATENTS

| Number | Country | Date |
|---|---|---|
| 588,908 | France | May 18, 1925 |